United States Patent
Li

(10) Patent No.: US 8,330,728 B2
(45) Date of Patent: Dec. 11, 2012

(54) INFORMATION INPUT DEVICE FOR PORTABLE ELECTRONIC APPARATUS AND CONTROL METHOD

(75) Inventor: Zhongqing Li, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 1208 days.

(21) Appl. No.: 11/794,437

(22) PCT Filed: Jul. 12, 2005

(86) PCT No.: PCT/CN2005/001024
§ 371 (c)(1),
(2), (4) Date: Aug. 6, 2007

(87) PCT Pub. No.: WO2006/069507
PCT Pub. Date: Jul. 6, 2006

(65) Prior Publication Data
US 2008/0165138 A1    Jul. 10, 2008

(30) Foreign Application Priority Data
Dec. 31, 2004    (CN) .......................... 2004 1 0103133

(51) Int. Cl.
*G06F 3/041*    (2006.01)
(52) U.S. Cl. ........................... 345/173; 345/156
(58) Field of Classification Search .................. 345/156, 345/173, 175, 177
See application file for complete search history.

(56) References Cited

U.S. PATENT DOCUMENTS

| | | | |
|---|---|---|---|
| 6,208,330 B1 * | 3/2001 | Hasegawa et al. ............ | 345/173 |
| 6,574,095 B2 | 6/2003 | Suzuki .......................... | 361/680 |
| 6,757,002 B1 | 6/2004 | Oross et al. .................... | 345/864 |
| 6,930,672 B1 | 8/2005 | Kuribayahi .................... | 345/173 |
| 7,561,146 B1 * | 7/2009 | Hotelling ...................... | 345/175 |
| 2001/0055195 A1 | 12/2001 | Suzuki .......................... | 361/680 |
| 2004/0085300 A1 * | 5/2004 | Matusis ......................... | 345/173 |
| 2005/0057489 A1 | 3/2005 | Kung et al. .................... | 345/156 |

(Continued)

FOREIGN PATENT DOCUMENTS

CN    1251439    4/2000

(Continued)

OTHER PUBLICATIONS

Office Action from Chinese Application No. 2004101031338, dated Dec. 22, 2006, 5 pgs.

(Continued)

*Primary Examiner* — Quan-Zhen Wang
*Assistant Examiner* — Yuk Chow
(74) *Attorney, Agent, or Firm* — Westman, Champlin & Kelly, P.A.

(57) ABSTRACT

The present invention discloses an information input device for a portable electronic apparatus comprising a touch unit for perceiving the touch from a user and generating a change in current, a current detection unit for detecting said change in current and sending associated detection signal, an input information generating unit for generating input information based on said detection signal and an output interface for transferring said input information to said electronic apparatus, which further comprises: an input state acquisition unit for acquiring the input state when the user uses said portable electronic apparatus; and an input switch unit for parsing said input state and control the on and off of trackpad-type input of said portable electronic apparatus based on said input state. An information input control method for a portable electronic apparatus is also disclosed.

21 Claims, 6 Drawing Sheets

U.S. PATENT DOCUMENTS

2006/0044259 A1 * 3/2006 Hotelling et al. .............. 345/156

FOREIGN PATENT DOCUMENTS

| | | |
|---|---|---|
| CN | 1521624 | 8/2004 |
| CN | 1591296 | 3/2005 |
| DE | 100 39 432 C1 | 12/2001 |
| DE | 102 21 854 A1 | 12/2002 |
| GB | 2 380 584 | 4/2003 |
| GB | 2 380 585 | 4/2003 |
| JP | 10-333804 | 12/1998 |
| JP | 10333804 | 12/1998 |
| JP | 2000-336810 | 12/2000 |
| JP | 2001-142634 | 5/2001 |
| JP | 2002-149345 | 5/2002 |
| JP | 2003099187 | 4/2003 |

OTHER PUBLICATIONS

Office Action from German Application No. 11 2005 003 342.2, dated Sep. 25, 2007, 4 pgs with translation.

Office Action from German Application No. 11 2005 003 342.2, dated Jan. 17, 2008, 7 pgs with translation.

Office Action from UK Application No. GB0714970.1, dated Nov. 11, 2009, 2 pgs.

Office Action from Japanese Application No. 2007-548669, dated Jan. 27, 2010, 3 pgs. with translation.

Search Report for PCT/CN2005/001024, Sep. 23, 2005.

* cited by examiner

INFORMATION INPUT DEVICE FOR PORTABLE ELECTRONIC APPARATUS AND CONTROL METHOD

CROSS-REFERENCE TO RELATED APPLICATION

This Application is a Section 371 National Stage Application of International Application No. PCT/CN2005/001024, filed Jul. 12, 2005 and published as WO 2006/069507 on Jul. 6, 2006, not in English, the contents of which is hereby incorporated by reference in its entirety.

BACKGROUND OF THE INVENTION

1. Field of Invention

The present invention relates to the technology for controlling position input in a portable electronic apparatus, in particular to an information input device for a portable electronic apparatus and a method for controlling the input device.

2. Description of Prior Art

In the rapid evolution of computer technology, the invention of the mouse has brought considerable convenience to people, the mouse thus has been given a full play to its role and maintained a constant development in its own technical aspect. From the original X/Y-axis mechanical mouse to the photoelectric reflective mouse and the photoelectric-coded mechanic wheel rotary mouse and further to the current optical-image position sensor mouse, the mouse has advanced remarkably in terms of performance, reliability, precision and so on. Moreover, the functions of the mouse have been greatly expanded, for example, with the addition of roller operation.

With the development of information technology and the ever growing demand for mobile computation, new requirement has been proposed on the position input device of a mobile or portable computer, that is, the position input device in the portable computer needs a size small enough for handy carrying; and it should be integrated with the portable computer so as to avoid any plug-in or pull-out action during the use of the portable computer and the need for any wire dangling externally, thereby providing a tiny and clean appearance as a whole.

It is constrained to integrate a mouse and its variations, such as track ball, into a portable computer due to the relatively large size of the mouse itself, especially the rolling ball in it. Thus the application of the mouse to a notebook computer suffers inevitable limitation as a whole. As to the mouse itself, its design has considered the requirement of people: first, it is suitable for manipulation with hand since the fingers can remain curved naturally and only need to apply a slight force as the wrist moves; second, it can be moved in a relatively large area with very high accuracy and sensitivity. Thanks to these merits, the mouse-like position input devices are necessary for some occasions with accurate positioning requirements, such as cartography and game playing.

In addition to the ordinary plug-in mouse, there are mainly three types of integrated position input devices commonly used in current portable computers. The first type refers to a trackpoint, which is embedded at certain position in the middle of a keyboard. A position signal is generated from the shaking of the trackpoint caused by a user's fingers, and the position of a cursor on a display is determined by detecting the change in the signal. The second type is a trackpad, which is a small touch window disposed below or adjacent to a keyboard. When a user moves his or her fingers on the window, the change in the position of the fingers is perceived through resistors, capacitors or inductors underlying the window. The third type is a touchpanel, usually disposed below a display screen as a perceptive device layer and generally divided into these categories, such as resist, capacitance, inductance and infrared. The touchpanel can also be equipped with an auxiliary positioning device, for example, stylus, magnetic pen or optical pen.

Among the three types of position input devices, the trackpoint has the advantage in its size much smaller than that of a key in a keyboard. Unfortunately, the trackpoint is inconvenient to manipulate due to its inconformity to the habits of most users. Besides, the fingers of a user have to consistently apply certain force during the movement of the cursor; the operation of positioning has a lower precision since the distance and speed for displacing a cursor are determined based on the force applied by the fingers; and keys for control operation are spaced a bit far away from the trankpoint, which makes a user have to stretch his or her fingers (thumb and index finger) or use both hands to carry out operations.

The touchpanel is more intuitive such that a user can operate directly on a displayed image. It enables handwriting input and is suitable for apparatuses with no keyboard, such as computer with flat-panel display or PDA. The accuracy of the touchpanel is not satisfactory, however, and given the existing technology, its input speed is far behind that of the combination of keyboard and mouse.

The trackpad is good at controllability and can be manipulated with a single hand. Moreover, it is intuitive, small and durable, and therefore widely used in the notebook computer. The trackpad generally has two types, resist-type and capacitance-type, and the latter has developed a more advantageous position detection method in terms of overall performance.

Now referring to FIG. 1, which is a schematic diagram for the capacitance-type position detection method and in which the trackpad comprises an underlying board 2, a surface insulating layer 3 and sensor strips 4 and 5. The sensor strips 4 and 5 forms a fixed sensor array by use of the standard PCB (Printed Circuit Board) or flexible circuit technology, and voltage is applied on the four corners of the trackpad and forms a fixed electric field. When a finger 1 moving on the surface layer, a change is caused in the capacitance of the sensor strip closest to the finger 1, and a current is generated by the electric field based on the change in capacitance. Then, with the measurement by a controller (not shown), the position of the finger can be calculated based on the ratio difference in the distance between the current and the four corners. The specific principle is shown in FIG. 2, and the used formula is $X=i_2/I*a$, $Y=i_3/I*b$, $I=i_1+i_2+i_3+i_4$, where a and b represents length and width, respectively.

It should be noted that the capacitance-type trackpad is reactive to finger and palm but not to nail, so the capacitance-type trackpad is characterized in its sensitivity to human body capacitance but not to contact area. The reason is that any influence from a large contact area is removed when the capacitance-type trackpad eliminates the interference of noise caused by static electricity, and only the position of the center of the contact area is recorded, therefore it cannot distinguished whether a finger or a whole palm moves on the surface layer.

Although popular with the notebook computer, the trackpad is indeed less controllable than an ordinary mouse. This serves as a key reason for presenting a mouse accompanying a notebook computer sold out.

The unsatisfactory controllability of the trackpad can be generally attributed to the following factors. The first factor is related to the location of the trackpad which usually lies at a position below a keyboard and near the space key. Since the space key is often pressed with a thumb, and the thumb tends to touch the trackpad during actual operation, the position of a cursor is easy to be displaced by unintentional touch of the thumb, and even misoperations, such as input at an incorrect position, would occur due to a high sensitivity of the trackpad, thereby adversely lowering the efficient of keyboard input. Furthermore, it is difficult to operate with only one hand since the relative location of keys and the trackpad is unsuitable for single-hand operation. Some complex cursor and key manipulations, for example, game playing, drawing, etc., are not easy to be completed with the trackpad since its utilizing manner is different from that of an ordinary mouse and hence inconvenient and inflexible when compared to the mouse.

In the technical solution disclosed in Japanese Patent Document JP 20000336810, various functions are provided at different positions of a trackpad. This can facilitate trackpad manipulation to some extent while fulfilling several functions, such as scrolling and window operation. In addition, some customized functions can be provided. Referring to FIG. 3, the trackpad 10 comprises a track region 34, four regions 38a, 38b, 38c and 38d for defining various functions and provided at four corners, two keys 18, a region 36 having up- and down-scrolling functions, a switch 33 and a indicator light 35 of the trackpad. The provision of the switch 33 primarily aims to prevent any misoperation since the thumbs tend to touch the trackpad 10 and result in false actions of a cursor when a use inputs characters on a keyboard with both of his or her hands. With the provision of the switch 33, however, the trackpad 10 can be turned off and the indicator light 35 becomes off in the process of input via the keyboard. When the trackpad 10 is used for operations related to position, the switch 33 is on and the indicator light 35 is turned on such that the trackpad 10 can take effect as usual.

Though the above method brings the advantage of preventing any misoperation, it gives rise to some unnecessary troubles. First, the switch has to be searched with a user's fingers, and if the fingers cannot touch the switch immediately, the user has to check where the switch is with his or her eyes, which draws the user's attention away from the screen and is adverse to his or her work efficiency. Meanwhile, the action of switching between position input and character input has to be added and hence cause inconvenience to the user. In the case of having no knowledge in advance as to whether the trackpad switch is on, the user has to check whether the indicator light is lit on or to test whether the trackpad works normally. This also adds to inconvenience undesired by the user.

English Patent Document GB2380584 discloses a method for preventing misoperation caused by a thumb, the principle of which is, when it is detected that the keyboard of a notebook computer is been stricking by a user, the trackpad is turned off automatically for a while or the input from the trackpad is neglected, while the trackpad is turned on automatically when it is detected that the user temporarily stops striking the keyboard, and hence the probability of misoperation on the trackpad can be significantly reduced.

This method has obvious drawbacks. First, the user will not continuously tap the keyboard when input on the keyboard, especially when he or she is writing an article and needs some time for contemplation. Therefore, pause and temporary stop often occur in the process of input on the keyboard, and the unintended touch on the trackpad happening just after a pause and at the start of tapping the keyboard again also leads to misoperation. Second, the frequency switching between the trackpad and the keyboard is necessary for many occasions, the fact that the trackpad can be turned on only when the keyboard input is stopped slows down the speed of switching between the keyboard and the trackpad and hence affects the efficiency of input. Therefore, this method cannot eliminate misoperation completely but can reduce the probability of misoperation only to some extent, and it makes the latency for switching longer and the operation efficiency for mixed input of text and graphics degraded.

SUMMARY OF THE INVENTION

In view of the disadvantages of the prior art, the object of the present invention is to provide an information input device for a portable electronic apparatus and a method for controlling the input device, which can prevent the occurrence of any misoperation when a trackpad is touched during keyboard input operation and also facilitate the operation.

To this end, the technical solution for the above problems provided by the present invention is an information input device for a portable electronic apparatus, which comprises a touch unit for perceiving the touch from a user and generating a change in current, a current detection unit for detecting said change in current and sending associated detection signal, an input information generating unit for generating input information based on said detection signal and an output interface for transferring said input information to said electronic apparatus. Said information input device further comprises:
an input state acquisition unit for acquiring the input state when the user uses said portable electronic apparatus;
an input switch unit for parsing said input state and control the on and off of trackpad-type input of said portable electronic apparatus based on said input state.

Preferably, said input state acquisition unit is an input state determiner which acquires the input state of said portable electronic apparatus based on the detection signal by said current detection unit.

Preferably, said input information generating unit, said input station acquisition unit and said input switch unit are elements separated from or integrated with each other or software modules executed by the processor of said information input device.

Preferably, said input state determiner is an area-calculating module which calculates the touched area of said touch unit based on said detection signal.

Preferably, said input state acquisition unit is an input state detector which acquires the input state of said portable electronic apparatus based on the detection of the position of the user's hand.

Preferably, said input state detector is used for detecting the position of the user's hand and which may be a mechanical detector, an infrared detector, a visible light detector or an inductive detector.

Preferably, said input switch unit is an output interface control unit, and the output interface is opened when it is determined that the input state is the user uses said input information device, otherwise the output interface is closed.

Preferably, said input switch unit is an input information generation control unit, and said input information generating unit is turned on when it is determined that the input state is the user uses said input information device, otherwise said input information generating unit is turned off.

Preferably, said input switch unit is a processor interface control unit, and the reception of input information by said electronic apparatus is enabled when it is determined that the input state is the user uses said input information device, otherwise the reception of input information by said electronic apparatus is prohibited.

Preferably, said input state acquisition unit is an image acquirer which films the position of the user's hand.

Preferably, said input switch unit is an input reception control unit which is located in the processor of said portable electronic apparatus and parses the signal acquired by said an image acquirer, and the reception of input information by said electronic apparatus is enabled when it is determined that the input state is the user uses said input information device, otherwise the reception of input information by said electronic apparatus is prohibited.

The present invention further provides an information input control method for a portable electronic apparatus, which is applicable to an electronic apparatus with a trackpad-type information input device and comprises steps of:

1) acquiring the input state in which a user uses said portable electronic apparatus;
2) parsing said input state and controlling the on and off of trackpad-type input of said portable electronic apparatus based on said input state.

Preferably, the acquisition in said step 1) further comprises:

11) receiving a detection signal obtained by said trackpad-type information input device with respect to the user's touch;
12) determining whether the user correctly uses said trackpad-type information input device based on said detection signal.

Preferably, the acquisition in said step 12) further comprises: calculating the contact area between the user and said trackpad-type information input device based on said detection signal and comparing said contact area and a preset value; if said contact area is less than the preset value, it means that the user uses said trackpad-type information input device correctly, otherwise it means the user misoperates said trackpad-type information input device.

Preferably, the acquisition in said step 1) further comprises:

1a) detecting the position of the user's hand;
1b) determining whether the user intends to use said trackpad-type information input device based on said position of the user's hand.

Preferably, said detecting can carried out with a mechanical detector, an infrared detector, a visible light detector or an inductive detector.

Preferably, the control in said step 2) further comprises: the output interface of said trackpad-type information input device is opened when it is determined that the input state is the user uses said trackpad-type information input device, otherwise the output interface of said trackpad-type information input device is closed; or the input information generating unit of said trackpad-type information input device is turned on when it is determined that the input state is the user uses said trackpad-type information input device, otherwise the input information generating unit of said trackpad-type information input device is turned off; or the reception of input information by said electronic apparatus is enabled when it is determined that the input state is the user uses said trackpad-type information input device, otherwise the reception of input information by said electronic apparatus is prohibited.

Preferably, the acquisition in said step 1) further comprises:

1A) filming the image of the position of the user's hand using an image acquirer;
1B) sending said filmed image to said electronic apparatus.

The parsing and control in said step 2) is specifically that said electronic apparatus parses the signal acquired by said image acquirer, and the reception of input information by said electronic apparatus is enabled when it is determined that the input state is the user uses said input information device, otherwise the reception of input information by said electronic apparatus is prohibited.

The present invention has the following benefits compared with the prior art. Since the input state acquisition unit is utilized to acquire the input state in which the user uses the portable electronic apparatus, and the input switch unit is employed to parse the input state and control the on and off of the information input device based on the input state, the present invention enables an automatic recognition between normal and erroneous operation of the trackpad and thus prevents misoperation caused by the thumb at the time of input on the keyboard of a notebook computer. The present invention can enhance the convenience for manipulation and improve the work efficient of the user. Moreover, the present invention is easy to realize and low in cost.

Especially in preferred embodiments of the present invention, there is little increase in hardware cost.

DETAILED DESCRIPTION OF PREFERRED EMBODIMENTS

The present invention provides the addition of automatic recognition on the basis of the existing trackpad-type input technology. Specifically, it is automatically recognized whether a user inputs in a keyboard manner or in a trackpad manner. Processing is carried out correspondingly such that, when the user conducts keyboard inputting, the signal for trackpad inputting is not processed and hence the user can focus on keyboard inputting. When the user wants to conduct positioning input in the trackpad manner, the signal for trackpad inputting is processed and hence the user can focus on positioning input.

Usually, the user of a notebook computer have the following characteristic manner in using the computer: positioning input and character input are not conducted simultaneously, that is, the character input on a keyboard and the positioning input on a trackpad never happens at the same time. The reason is that the character input on a keyboard and the positioning input on a trackpad must be done by the user's hand. Additionally, most of operating systems don't enable the user to input characters at the same time of moving a cursor. And only one of the two actions can be performed at one moment. Sometimes there may be frequent switching between the two actions, in particular at the time of mixed input of text and graphics.

The likelihood for occurrence of interference between a keyboard and a mouse is narrow as a result of a large distance between them. While on a small-sized notebook computer, the trackpad and the keyboard is close to each other, the problem of interference becomes critical. In order to solve this problem, there arises the need for a technical solution to automatically distinguish the two types of inputting and avoid the interference between them.

Figure 1:
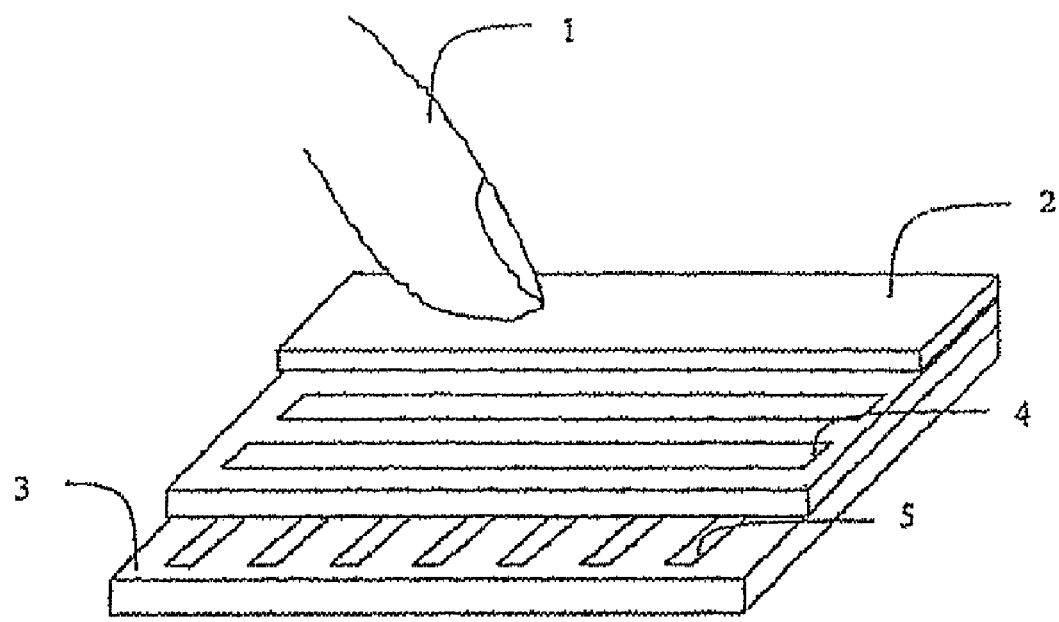
FIG. 1 is a schematic diagram for a capacitance-type position detection method.
Figure 2:
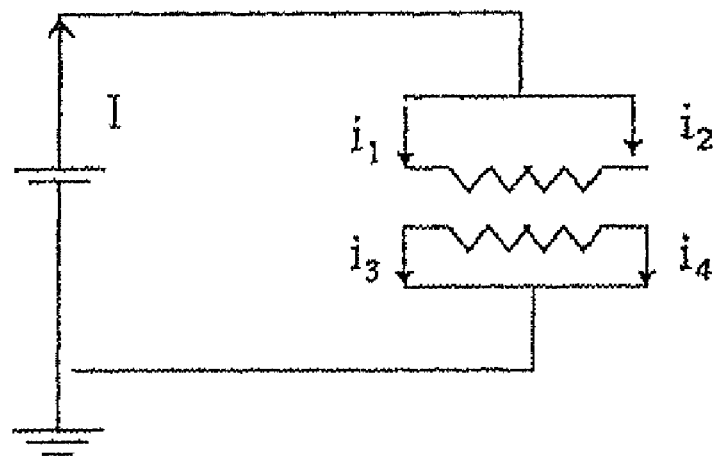
FIG. 2 is a schematic circuit diagram for a capacitance-type position detection method.
Figure 3:
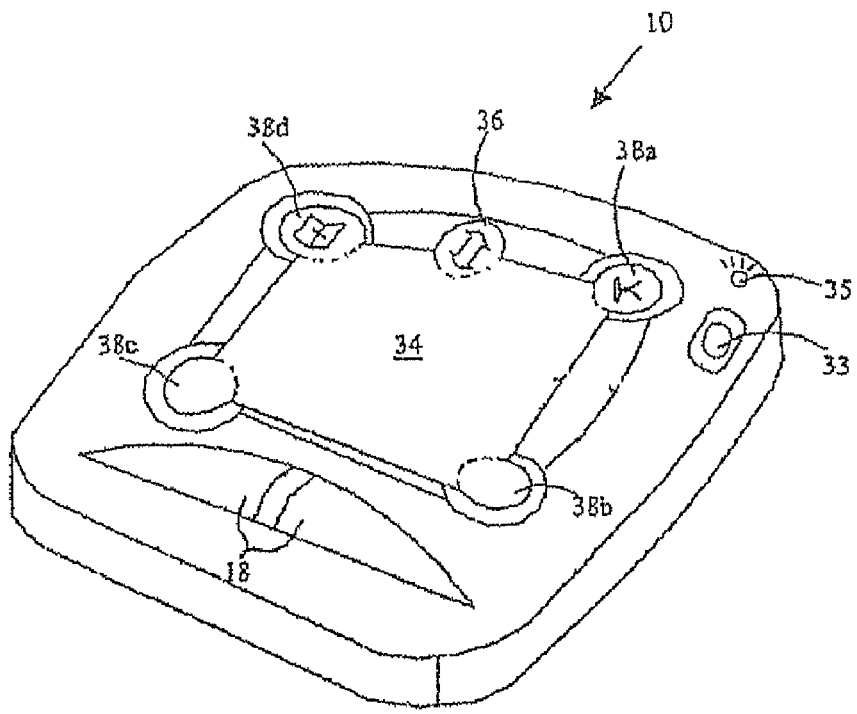
FIG. 3 is a perceptive diagram for a trackpad in prior art.
Figure 4:
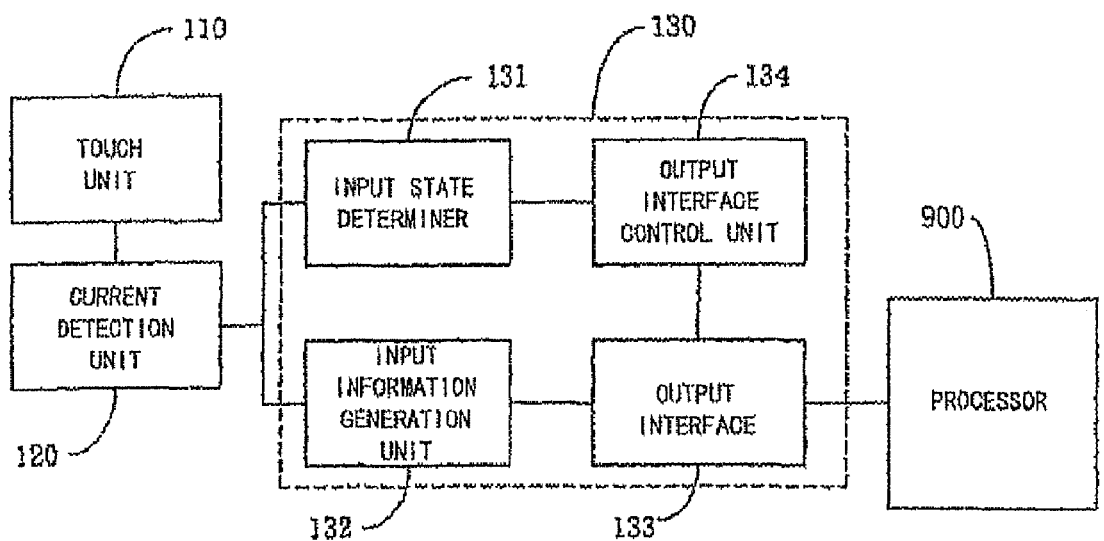
FIG. 4 is a block diagram for the first embodiment of an information input device according to the present invention.

Now turn to FIG. 4 which shows a block diagram for the first embodiment of an information input device according to the present invention.

The information input device includes a touch unit 110, a current detection unit 120 and a processing unit 130. The touch unit 110 perceives the touch from a user and generate a change in current. The current detection unit 120 is connected to the touch unit, detects the above change in current and sends associated detection signal. The processing unit 130 is connected to the current detection unit 120, processes the detection signal correspondingly, and generates input information and transfers to a processor 900.

The processing unit 130 includes an input state determiner 131, an input information generation unit 132, an output interface 133 and an output interface control unit 134. The input state determiner 131 is connected to the current detection unit 120 and the output interface control unit 134 and is configured to determine whether the user is currently inputting in the trackpad manner or not based on the detection signal. If the user is conducting a trackpad input, the output interface control unit 134 opens the output interface 133, otherwise it closes the output interface 133. The input information generating unit 132 is connected to the current detection unit 120 and the output interface 133 and is configured to generate associated input information based on the detection signal and send it to the output interface 133, which connects the processing unit 130 and the processor 900.

An area-calculating module can be employed as the input state determiner 131. In this case, the judgment as to whether the user is making a trackpad input or not can be conducted by recognizing the contact area, mainly distinguishing between fingertip and palm, entire finger or the side of a finger, and determining it based on the contact area. The user's input is referred to as an abnormal trackpad input and will be neglected if the contact area is larger than a preset value.

The input information generating unit 132 can be a position-calculating unit for calculating the average center position of contact points. It is obvious that this unit can generate other types of input information.

Figure 5:
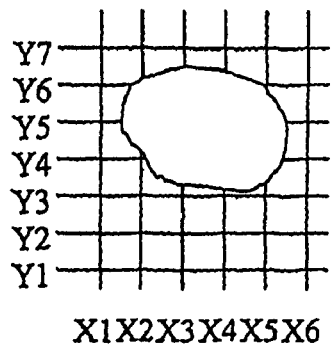
FIG. 5 is a schematic diagram for a touch unit in the embodiment shown in FIG. 4.

The specific scheme will be described with reference to FIG. 5. The current in the electric field is changed as soon as the user contacts with the touch unit 110 of the information input device with his or her finger. The current detection unit 120 then detects whether the current changes in respective sensors along X and Y axes or not, and inputs the current value on the sensors with current change into the processing unit 130, which carries out area calculation. For example, one simple way is to calculate the sum number of the sensors having current change. As shown in this Figure, there are 7 sensors, namely, Y4, Y5, Y6, X2, X3, X4, and X5, in which the current has changed. Since the threshold for closing the trackpad output is given as 9, the above sum is less than the given threshold, and the position signal is normally output to the processor 900 after noise elimination and position calculation.

In other words, when the contact position of the finger on the touch unit 110 is measured, further control can be added besides calculating the center position of the contact point. To be more specific, the contact area of the finger or the palm can be deduced from the detected number of the sensors with current change. And the output will be closed if the contact area exceeds a prescribed value so as to prevent any erroneous operation from occurring.

Figure 6:
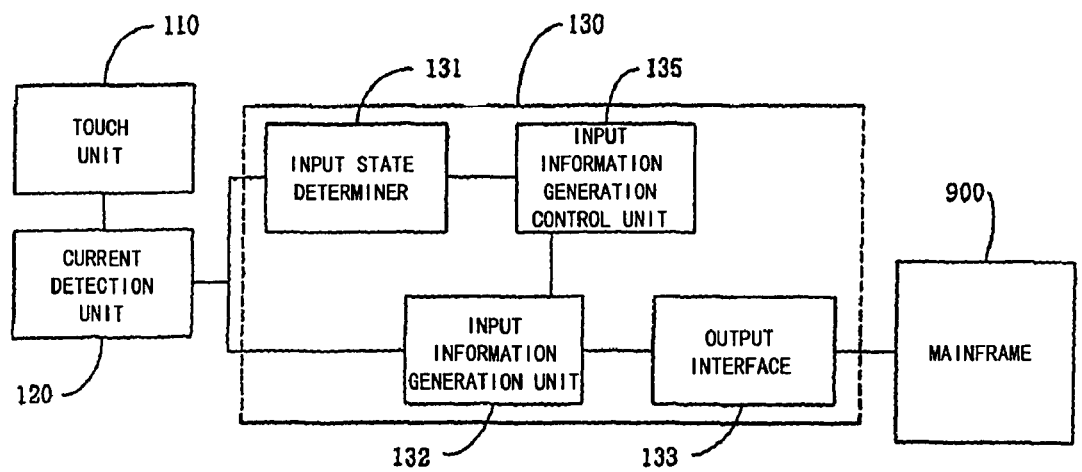
FIG. 6 is a block diagram for the second embodiment of an information input device according to the present invention.

Now refer to FIG. 6, which is a block diagram for the second embodiment of an information input device according to the present invention.

This embodiment is substantially the same as the first one but with the following difference: instead of the output interface control unit 134, an input information generation control unit 135 is used as the input switch unit in this embodiment. The input state determiner 131 is connected to the input information generation control unit 135, which controls the on and off of the input information generating unit 132 based on the result of the determination. In particular, the input information generating unit 132 doesn't process the detected signal while the user is inputting on the keyboard, thereby the user can focus on keyboard input; on the other hand, the input information generating unit 132 processes the detected signal when the user wants to input via the touch unit 110, and the user can focus on trackpad input.

It should be noted that said input state determiner 131, said input information generating unit 132 and output interface 133, said output interface control unit 134 and said input information generating control unit 135 can be elements separated from or integrated with each other. They can also be implemented in software, that is, the processing unit 130 can be a processor chip with built-in software.

Figure 7:
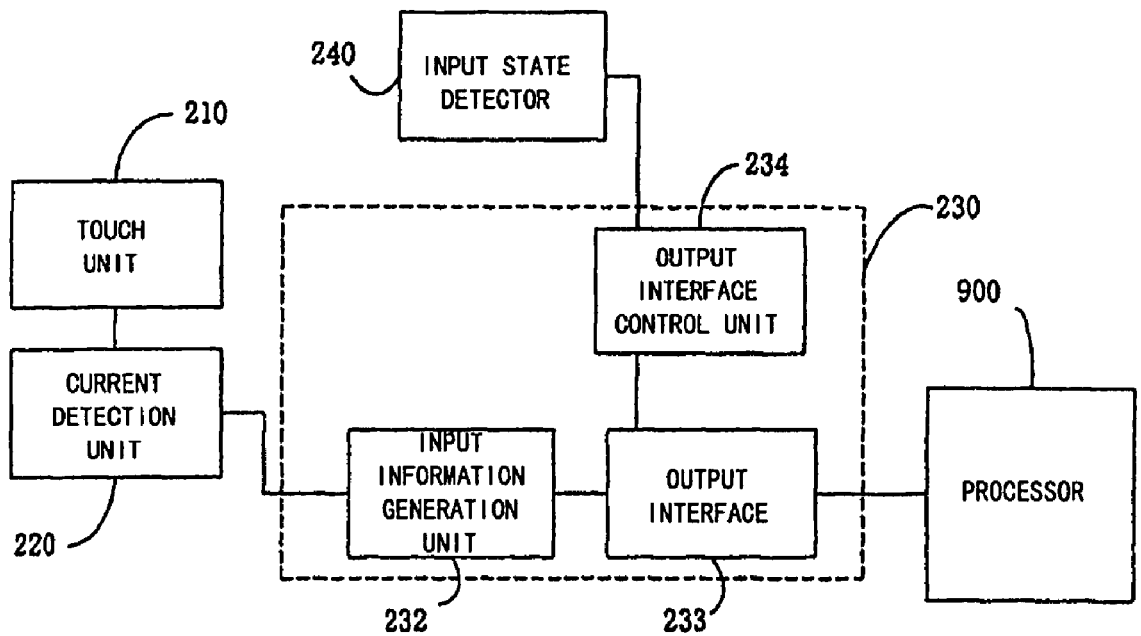
FIG. 7 is a block diagram for the third embodiment of an information input device according to the present invention.

Now refer to FIG. 7, which is a block diagram for the third embodiment of an information input device according to the present invention.

This information input device includes a touch unit 210, a current detection unit 220, a processing unit 230 and an input state detector 240. The touch unit 210 perceives the touch from a user and generate a change in current. The current detection unit 220 is connected to the touch unit 210, detects the above change in current and sends associated detection signal. The processing unit 230 is connected to the current detection unit 220, processes the detection signal correspondingly, and generates input information and transfers to a processor 900.

The input state detector 240 is connected to the processing unit 230, makes determination as to the user's input state and controls the on/off of the processing unit 230 based on the determination result.

The processing unit 230 includes an input information generating unit 232, an output interface 233 and an output interface control unit 234. The input information generating unit 232 is connected to the current detection unit 220 and the output interface 233 and configured to generate associated input information based on the detection signal and send it to the output interface 233, which connects the processing unit 230 and the processor 900.

The input state detector 240 is connected to the output interface control unit 234 and determines whether the user is currently input in the trackpad manner or not; if the user is conducting a trackpad input, the output interface control unit 234 opens the output interface 233; otherwise it closes the output interface 233.

The input state detector 240 can be located at a position where the user puts both of his or her hands on a notebook computer and configured to automatically detect whether the two hands are on the keyboard or not. If it is detected that both of the user's hands are on the keyboard, the input state detector 240 turns off the trackpad input. If one of the hands is withdrawn from the keyboard, the input state detector 240 turns on the trackpad input. Preferably, the input state detector 240 of the information input device could be disposed on the bottom side of the keyboard of a notebook computer such that the input state detector 240 is located directly below the position of the user's palms. Therefore, while the user is operating on the keyboard with both of his or her hands, the palms can press the input state detector 240 in a natural fashion without the need for specially finding out where the input state detector 240 is. The input state detector 240 can be the type of mechanical, infrared, visible light or inductance.

Figure 8:
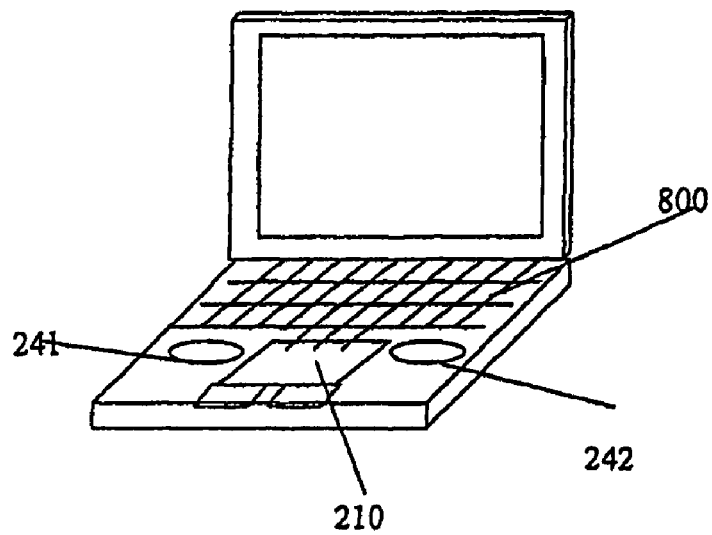
FIG. 8 is a schematic diagram for a state detector in the embodiment shown in FIG. 7.

The input state detector 240 will be further explained with reference to FIG. 8, in which the input state detector 240 includes a left-side switch 241 and a right-side switch 242. Both of the left-side switch 241 and the right-side switch 242 are connected to the output interface control unit 234 via an AND gate 243. And the switch acts in such a logic that, when both of the left-side switch 241 and the right-side switch 242 are pressed down; or when the light to both the switches is blocked, or both of the switches can sense the user's palms, it is indicated that the user is conducting input via the keyboard 800, and the output of the processing unit 230 is closed; the output of the processing unit 230 is opened if one of the switches is released.

It is obvious that the input state detector 240 can also impose control on input by controlling on/off of the input information generating unit 232. Specifically, the input state detector 240 is connected to the input information generating unit 232 and directly control the on and off of the input information generating unit 232 based on the determination result, that is, the input information generating unit 232 doesn't process the detected signal while the user is inputting on the keyboard, thereby the user can focus on keyboard input; on the other hand, the input information generating unit 232 processes the detected signal when the user wants to input via the touch unit, and the user can focus on trackpad input.

Figure 9:
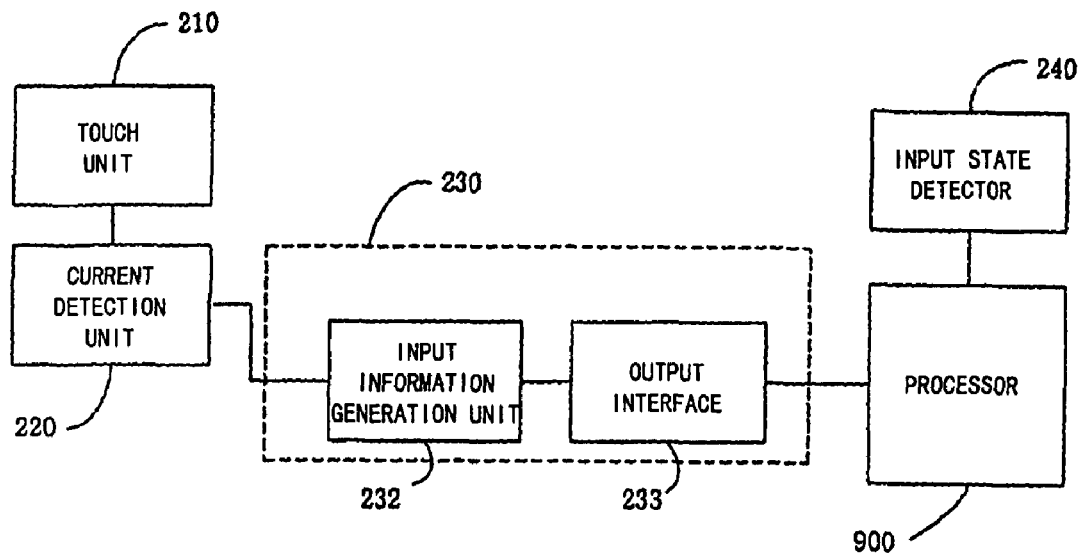
FIG. 9 is a block diagram for the fourth embodiment of an information input device according to the present invention.

Now refer to FIG. 9, which is a block diagram for the fourth embodiment of the present invention.

This embodiment is substantially the same as the third one but with the following difference: instead of providing the output interface control unit 234, the input state detector 240 is connected to a processor interface control unit 910. Based on the result of the determination, it directly controls the interface control unit 910 to decide whether the processor 900 can receive data from the output interface 233 or not. In particular, the processor 900 doesn't receive data from the output interface 233 while the user is inputting on the keyboard, thereby the user can focus on keyboard input; on the other hand, the processor 900 receives data from the output interface 233 when the user wants to input via the touch unit, so that the user can focus on trackpad input.

Figure 10:
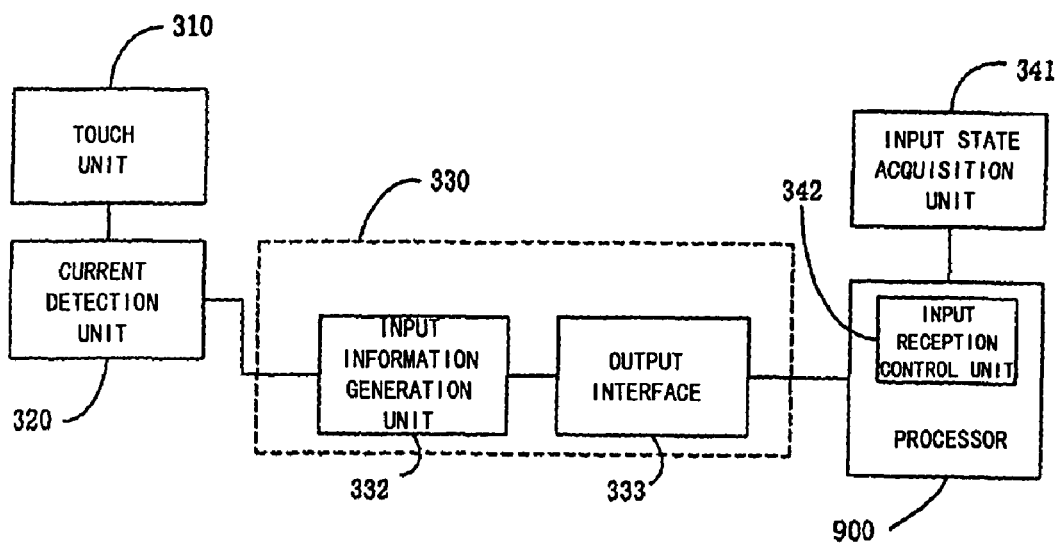
FIG. 10 is a block diagram for the fifth embodiment of an information input device according to the present invention.

Now refer to FIG. 10, which is a block diagram for the fifth embodiment of the present invention.

This information input device includes a touch unit 310, a current detection unit 320, a processing unit 330 and an input state acquisition unit 341. The touch unit 310 perceives the touch from a user and generate a change in current. The current detection unit 320 is connected to the touch unit 310, detects the above change in current and sends associated detection signal. The processing unit 330 is connected to the current detection unit 320, processes the detection signal correspondingly, and generates input information and transfers to a processor 900. And the input state acquisition unit 341 is connected to the processor 900, acquires the user's input state and sends it to the processor 900, which parses the acquired information and decides whether to receive data from the processing unit 330 or not.

The processing unit 330 includes an input information generating unit 332 and an output interface 333. The input information generating unit 332 is connected to the current detection unit 320 and the output interface 333 and is configured to generate associated input information based on the detection signal and send it to the output interface 333, which connects the processing unit 330 and the processor 900.

The input state acquisition unit 341 can utilize an image acquisition unit, for example, PC camera, to assist recognition as to whether both of the use's hands are put on the keyboard or not. In this case, an input reception control unit 342 is provided inside the processor 900 and configured to parse data from the image acquisition unit. The input reception control unit 342 in the processor 900 prohibits the reception of data from the output interface 333 if both of the user's hands are on the keyboard. It enables the reception of data from the output interface 333 if one of the hands is removed from the keyboard.

It should be noted that the input reception control unit 342 could be implemented in physical hardware or as software module inside the processor 900.

Figure 11:
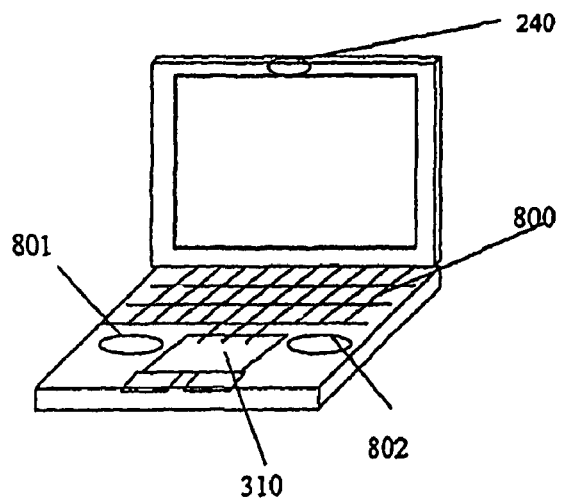
FIG. 11 is a schematic diagram for an input state acquisition unit in the embodiment shown in FIG. 10.

As shown in FIG. 11, the input state acquisition unit 341 can be a PC camera installed in a notebook computer and used to scan the keyboard region. During operation, the PC camera scans the entire region of the keyboard. When it is recognized that both of the user's hands are put on the keyboard or when both of two flags on the keyboard are blocked, the PC camera sends the first signal to the processor 900, which prohibits the reception of data from the output interface 333. It sends the second signal to the processor 900 if one of the hands is withdrawn from the keyboard or one of the flags isn't blocked, and the processor 900 enables the reception of data from the output interface 333.

Figure 12:
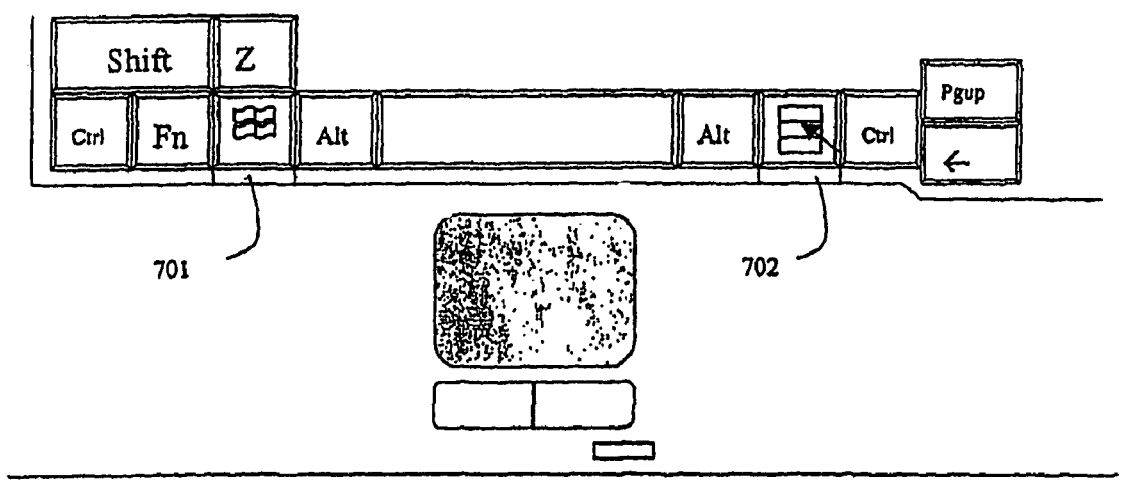
FIG. 12 is a block diagram for a specific example of an information input device according to the present invention.

FIG. 12 shows one specific example of the present invention.

At the joint position of the bottom part of the keyboard and the processor of a notebook computer, two infrared detectors 701 and 702 are provided on the left and the right sides, respectively. They are exactly located at such positions that a user's hands can just cover the two detectors when the user is operating with both of his or her hands. In this example, the left-side infrared detector 701 is disposed between the key Fn and the left key Alt and has a width of about 1 cm. The right-side infrared detector 702 is disposed between the right key Alt and the right key Ctrl. Both of the detectors are placed such that they face upwards to sense whether the user's palms are on the keyboard or not. The infrared detector can be selected as a common sensor for detecting infrared rays from human body, for example, a sensor used in a lamp in the corridor of a building controlled by infrared rays from human body. The detection distance can be within 5 cm. The infrared detectors 701 and 702 are subjected to AND operation and then connected to the output switch of the trackpad, the output of which will be closed if the two detectors each detect infrared signals from the user palms.

It will be appreciated that the present invention is applicable to not only a notebook computer but also other similar portable electronic apparatuses, and the automatic recognition mechanism is added on the basis of the existing trackpad input technology according to the present invention.

Accordingly, the flow of the information input control method for a portable electronic apparatus of the present invention is: acquiring the input state in which a user uses said portable electronic apparatus; and parsing said input state and controlling the on and off of trackpad-type input of said portable electronic apparatus based on said input state.

The above acquisition can be carried out in various fashions. For example it comprises the steps of receiving a detection signal obtained by said trackpad-type information input device with respect to the user's touch; and determining whether the user correctly uses said trackpad-type information input device or not based on said detection signal. In an example, the acquisition particularly includes calculating the contact area between the user and said trackpad-type information input device based on said detection signal and comparing said contact area and a preset value.

The acquisition can be carried out by a mechanical detector, an infrared detector, a visible light detector or an inductive detector to detect the position of the user's hand and determine whether the user intends to use said trackpad-type information input device or not based on said position of the user's hand.

The above acquisition can be carried out in various fashions. For example, the output interface of said trackpad-type information input device is opened when it is determined that the input state is that the user uses said trackpad-type information input device; otherwise the output interface of said trackpad-type information input device is closed; or the input information generating unit of said trackpad-type information input device is turned on when it is determined that the input state is that the user uses said trackpad-type information input device; otherwise the input information generating unit of said trackpad-type information input device is turned off; or the reception of input information by said electronic apparatus is enabled when it is determined that the input state is that the user uses said trackpad-type information input device; otherwise the reception of input information by said electronic apparatus is prohibited.

In the embodiments of the present invention, the acquisition can consist of filming the image of the position of the user's hand using an image acquirer and sending said filmed image to said electronic apparatus. Accordingly, said electronic apparatus parses the signal acquired by said image acquirer, and the reception of input information by said electronic apparatus is enabled when it is determined that the input state is the user uses said input information device; otherwise the reception of input information by said electronic apparatus is prohibited.

The above describes only the preferred embodiments of the invention. It will be appreciated for those skilled in the art that various modifications and refinements can be made in the principle of the present invention, and these modifications and refinements should fall into the scope of the present invention.

What is claimed is:

1. An information input device for a portable electronic apparatus comprising a touch unit for perceiving a touch from a user and generating a change in current, a current detection unit for detecting said change in current and sending corresponding detection signal, an input information generating unit for generating input information based on said detection signal and an output interface for transferring said input information to said electronic apparatus, wherein said information input device further comprises:

an input state acquisition unit for acquiring and judging whether the input state is a trackpad input state or not when the user uses said portable electronic apparatus; and an input switch unit for turning on the trackpad-type input of said portable electronic apparatus when the said input state is a trackpad input state, otherwise turning off the said trackpad-type input;

wherein said touch unit includes a plurality of sensors each configured to sense the touch from a user and generate a change in current, and said current detection unit detects change in current of each sensors, said input state acquisition unit comprises an area-calculating module configured to calculate, as a sum number of the sensors having a change in current, a size of a contact area between the user and the touch unit based on said detection signal from the current detection unit.

2. The information input device for a portable electronic apparatus according to claim 1, wherein said input state acquisition unit is further configured to compare said contact area and a preset value; if said contact area is less than the preset value, it means that the user uses said trackpad-type information input device correctly, otherwise it means the user misoperates said trackpad-type information input device.

3. The information input device for a portable electronic apparatus according to claim 2, wherein said input information generating unit, said input state acquisition unit and said input switch unit are elements separated from or integrated with each other or software modules executed by the processor of said information input device.

4. The information input device for a portable electronic apparatus according to claim 1, wherein said input switch unit is an output interface control unit, and the output interface is opened when it is determined that the input state is the user uses said input information device, otherwise the output interface is closed.

5. The information input device for a portable electronic apparatus according to claim 1, wherein said input switch unit is an input information generation control unit, and said input information generating unit is turned on when it is determined that the input state is the user uses said input information device, otherwise said input information generating unit is turned off.

6. The information input device for a portable electronic apparatus according to claim 1, wherein said input switch unit is a processor interface control unit, and the reception of input information by said electronic apparatus is enabled when it is determined that the input state is the user uses said input information device, otherwise the reception of input information by said electronic apparatus is prohibited.

7. The information input device for a portable electronic apparatus according to claim 1, wherein said input state acquisition unit further comprises an image acquirer which films the position of the user's hand.

8. The information input device for a portable electronic apparatus according to claim 7, wherein said input switch unit is an input reception control unit which is located in the processor of said portable electronic apparatus and parses the signal acquired by said an image acquirer, and the reception of input information by said electronic apparatus is enabled when it is determined that the input state is the user uses said input information device, otherwise the reception of input information by said electronic apparatus is prohibited.

9. An information input device for a portable electronic apparatus comprising a touch unit for perceiving a touch from a user and generating a change in current, a current detection unit for detecting said change in current and sending corresponding detection signal, an input information generating unit for generating input information based on said detection signal and an output interface for transferring said input information to said electronic apparatus, wherein said information input device further comprises:

an input state acquisition unit for acquiring and judging whether the input state is a trackpad input state or not when the user uses said portable electronic apparatus; and an input switch unit for turning on the trackpad-type input of said portable electronic apparatus when said input state is a trackpad input state, otherwise turning off the said trackpad-type input, wherein the portable electronic apparatus comprises a keyboard and a mainboard, and at least two detectors are provided at left and right side of a joint area between the keyboard and the mainboard, such that the user's hands cover the at least two sensors when the user is operating the keyboard, and said input state acquisition unit comprises an input state detector configured to detect the position of the user's hand by using the at least two detectors to detect whether the user's hands cover the at least two detectors.

10. The information input device for a portable electronic apparatus according to claim 9, wherein said input state detector comprises a mechanical detector, an infrared detector, a visible light detector or an inductive detector.

11. The information input device for a portable electronic apparatus according to claim 9, wherein said input information generating unit, said input state acquisition unit and said input switch unit are elements separated from or integrated with each other or software modules executed by the processor of said information input device.

12. The information input device for a portable electronic apparatus according to claim 9, wherein said input switch unit is an output interface control unit, and the output interface is opened when it is determined that the input state is the user uses said input information device, otherwise the output interface is closed.

13. The information input device for a portable electronic apparatus according to claim 9, wherein said input switch unit is an input information generation control unit, and said input information generating unit is turned on when it is determined that the input state is the user uses said input information device, otherwise said input information generating unit is turned off.

14. The information input device for a portable electronic apparatus according to claim 9, wherein said input switch unit is a processor interface control unit, and the reception of input information by said electronic apparatus is enabled when it is determined that the input state is the user uses said input information device, otherwise the reception of input information by said electronic apparatus is prohibited.

15. An information input control method for a portable electronic apparatus, which is applicable to an electronic apparatus with a trackpad-type information input device and comprises:

1) acquiring and judging whether the input state is a trackpad input state or not when a user uses said portable electronic apparatus; and 2) turning on the trackpad-type input of said portable electronic apparatus when the said input state is a trackpad input state, otherwise turning off the said trackpad-type input;

wherein the portable electronic apparatus includes a plurality of sensors each configured to sense a touch from a user on a touch unit of the portable electronic apparatus, and generate a change in current, and said acquiring and judging further comprises calculating, as a sum number of the sensors having a change in current, a size of a contact area between the user and the touch unit.

16. The information input control method for a portable electronic apparatus according to claim 15, wherein acquiring and judging further comprises: comparing said contact area and a preset value; if said contact area is less than the preset value, it means that the user uses said trackpad-type information input device correctly, otherwise it means the user misoperates said trackpad-type information input device.

17. The information input control method for a portable electronic apparatus according to claim 15, wherein controlling further comprises:

the output interface of said trackpad-type information input device is opened when it is determined that the input state is the user uses said trackpad-type information input device, otherwise the output interface of said trackpad-type information input device is closed; or the input information generating unit of said trackpad-type information input device is turned on when it is determined that the input state is the user uses said trackpad-type information input device, otherwise the input information generating unit of said trackpad-type information input device is turned off; or the reception of input information by said electronic apparatus is enabled when it is determined that the input state is the user uses said trackpad-type information input device, otherwise the reception of input information by said electronic apparatus is prohibited.

18. The information input control method for a portable electronic apparatus according to claim 15, wherein acquiring further comprises:

1A) filming the image of the position of the user's hand using an image acquirer;

1B) sending said filmed image to said electronic apparatus; and wherein the parsing and controlling comprises that said electronic apparatus parses the signal acquired by said image acquirer, and the reception of input information by said electronic apparatus is enabled when it is determined that the input state is the user uses said input information device, otherwise the reception of input information by said electronic apparatus is prohibited.

19. An information input control method for a portable electronic apparatus, which is applicable to an electronic apparatus with a trackpad-type information input device and comprises:

1) acquiring and judging whether the input state is a trackpad input state or not when a user uses said portable electronic apparatus; and 2) turning on the trackpad-type input of said portable electronic apparatus when said input state is a trackpad input state, otherwise, turning off the said trackpad-type input;

wherein the portable electronic apparatus comprises a keyboard and a mainboard, and at least two detectors are provided at left and right side of a joint area between the keyboard and the mainboard, such that the user's hands cover the at least two sensors when the user is operating the keyboard, and acquiring and judging further comprises:

1a) detecting the position of the user's hand by using, the at least two detectors to detect whether the user's hands cover the at least two detectors;

1b) determining whether the user intends to use said trackpad-type information input device based on said position of the user's hand.

20. The information input control method for a portable electronic apparatus according to claim 19, wherein the at least two detectors comprises mechanical detectors, infrared detectors, visible light detectors or inductive detectors.

21. The information input control method for a portable electronic apparatus according to claim 19, wherein controlling further comprises:

the output interface of said trackpad-type information input device is opened when it is determined that the input state is the user uses said trackpad-type information input device, otherwise the output interface of said trackpad-type information input device is closed; or the input information generating unit of said trackpad-type information input device is turned on when it is determined that the input state is the user uses said trackpad-type information input device, otherwise the input information generating unit of said trackpad-type information input device is turned off; or the reception of input information by said electronic apparatus is enabled when it is determined that the input state is the user uses said trackpad-type information input device, otherwise the reception of input information by said electronic apparatus is prohibited.

* * * * *